(12) United States Patent
Lean et al.

(10) Patent No.: US 9,862,624 B2
(45) Date of Patent: Jan. 9, 2018

(54) DEVICE AND METHOD FOR DYNAMIC PROCESSING IN WATER PURIFICATION

(75) Inventors: Meng H. Lean, Santa Clara, CA (US);
Jeonggi Seo, Albany, CA (US); Armin R. Völkel, Mountain View, CA (US);
Ashutosh Kole, Sunnyvale, CA (US);
Huangpin B. Hsieh, Mountain View, CA (US); Nitin S. Parekh, Los Altos, CA (US); Norine E. Chang, Menlo Park, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 480 days.

(21) Appl. No.: 11/936,753

(22) Filed: Nov. 7, 2007

(65) Prior Publication Data

US 2009/0114601 A1    May 7, 2009

(51) Int. Cl.
| | |
|---|---|
| *C02F 1/38* | (2006.01) |
| *C02F 1/52* | (2006.01) |
| *B01D 29/48* | (2006.01) |
| *B01D 46/40* | (2006.01) |
| *B01D 21/01* | (2006.01) |
| *B01D 21/26* | (2006.01) |
| *C02F 1/00* | (2006.01) |

(Continued)

(52) U.S. Cl.
CPC ............... *C02F 1/52* (2013.01); *B01D 21/01* (2013.01); *B01D 21/265* (2013.01); *B01D 25/20* (2013.01); *B01D 46/403* (2013.01); *C02F 1/001* (2013.01); *C02F 1/38* (2013.01); *C02F 1/5236* (2013.01); *C02F 1/56* (2013.01); *C02F 9/00* (2013.01); *C02F 2301/024* (2013.01); *C02F 2301/026* (2013.01); *C02F 2301/046* (2013.01)

(58) Field of Classification Search
USPC ............................................... 210/195.1, 656
See application file for complete search history.

(56) References Cited

U.S. PATENT DOCUMENTS

| | | |
|---|---|---|
| 1,133,721 A | 3/1915 | Gregg |
| 1,836,758 A | 12/1931 | Knapp |
| 2,426,804 A | 9/1947 | Roy |

(Continued)

FOREIGN PATENT DOCUMENTS

| | | |
|---|---|---|
| CN | 1149556 | 5/1997 |
| CN | 1149556 A | 5/1997 |

(Continued)

OTHER PUBLICATIONS

Thiruvenkatachari et al., "Flocculation-cross-flow microfiltration hybrid system for natural organic matter (NOM) removal using hematite as a flocculent," Desalination, Elsevier, Amsterdam, NL, vol. 147, No. 1-3, XP 004386413, pp. 83-88, Sep. 10, 2002.

(Continued)

*Primary Examiner* — Krishnan S Menon
(74) *Attorney, Agent, or Firm* — Fay Sharpe LLP

(57) ABSTRACT

A transformational approach to water treatment is provided that incorporates membrane-free filtration with dynamic processing of the fluid to significantly reduce treatment times, chemical cost, land use, and operational overhead. This approach provides hybrid capabilities of filtration, together with chemical treatment, as the water is transported through various spiral stages.

24 Claims, 16 Drawing Sheets

(51) Int. Cl.
*C02F 1/56* (2006.01)
*C02F 9/00* (2006.01)

(56) References Cited

U.S. PATENT DOCUMENTS

| | | | |
|---|---|---|---|
| 2,584,976 A | 2/1952 | Bailey, Jr. | |
| 2,615,572 A | 10/1952 | Hodge | |
| 3,225,523 A | 12/1965 | Wiebe | |
| 3,672,503 A | 6/1972 | Mark | |
| 3,693,791 A | 9/1972 | Beck | |
| 3,893,921 A * | 7/1975 | Walther et al. | 210/206 |
| 3,933,642 A * | 1/1976 | Wilson | 210/206 |
| 3,948,771 A | 4/1976 | Bielefeldt | |
| 4,001,121 A | 1/1977 | Bielefeldt | |
| 4,153,541 A | 5/1979 | Rumpf et al. | |
| 4,159,942 A | 7/1979 | Greer et al. | |
| 4,186,474 A | 2/1980 | Hine | |
| 4,189,378 A | 2/1980 | Wright et al. | |
| 4,292,050 A | 9/1981 | Linhardt et al. | |
| 4,324,334 A | 4/1982 | Wright et al. | |
| 4,343,707 A | 8/1982 | Lucas | |
| 4,383,917 A | 5/1983 | Wells | |
| 4,386,519 A | 6/1983 | Sinkey | |
| 4,451,367 A | 5/1984 | Ruggeri | |
| 4,460,391 A | 7/1984 | Muller et al. | |
| 4,462,907 A | 7/1984 | Waldecker | |
| 4,505,811 A | 3/1985 | Griffiths et al. | |
| 4,542,775 A | 9/1985 | Beck | |
| 4,795,553 A | 1/1989 | Giffard | |
| 4,872,972 A | 10/1989 | Wakabayashi et al. | |
| 4,927,437 A | 5/1990 | Richerson | |
| 5,059,226 A | 10/1991 | Schneider et al. | |
| 5,104,520 A | 4/1992 | Maronde et al. | |
| 5,120,436 A * | 6/1992 | Reichner | 210/207 |
| 5,193,688 A | 3/1993 | Giddings | |
| 5,248,421 A * | 9/1993 | Robertson | B01D 17/0217 209/723 |
| 5,314,529 A | 5/1994 | Tilton et al. | |
| 5,535,892 A | 7/1996 | Moorhead et al. | |
| 5,556,537 A | 9/1996 | Saarenketo | |
| 5,587,128 A | 12/1996 | Wilding et al. | |
| 5,632,957 A | 5/1997 | Heller et al. | |
| 5,653,859 A | 8/1997 | Parton et al. | |
| 5,690,763 A | 11/1997 | Ashmead et al. | |
| 5,715,946 A | 2/1998 | Reichenbach | |
| 5,728,262 A | 3/1998 | Moss et al. | |
| 5,958,240 A * | 9/1999 | Hoel | 210/608 |
| 5,971,158 A | 10/1999 | Yager et al. | |
| 5,993,668 A * | 11/1999 | Duan | 210/713 |
| 6,013,165 A | 1/2000 | Wiktorowicz et al. | |
| 6,087,608 A | 7/2000 | Schlichter et al. | |
| 6,100,535 A | 8/2000 | Mathies et al. | |
| 6,272,296 B1 | 8/2001 | Gartstein | |
| 6,355,491 B1 | 3/2002 | Zhou et al. | |
| 6,422,735 B1 | 7/2002 | Lang | |
| 6,454,945 B1 | 9/2002 | Weigl et al. | |
| 6,527,125 B2 | 3/2003 | Niitti | |
| 6,569,323 B1 | 5/2003 | Pribytkov | |
| 6,620,317 B2 * | 9/2003 | Alviti | C02F 1/52 210/205 |
| 6,827,911 B1 | 12/2004 | Gering | |
| 6,905,029 B2 | 6/2005 | Flagan | |
| 7,104,405 B2 | 9/2006 | Bohm et al. | |
| 7,156,970 B2 | 1/2007 | Lean et al. | |
| 7,163,611 B2 | 1/2007 | Volkel et al. | |
| 7,226,542 B2 | 6/2007 | Zemel et al. | |
| 7,241,423 B2 | 7/2007 | Golbig et al. | |
| 7,282,129 B2 | 10/2007 | Lean et al. | |
| 7,431,228 B2 | 10/2008 | Bohm et al. | |
| 7,473,216 B2 | 1/2009 | Lolachi et al. | |
| 7,491,307 B2 | 2/2009 | Hsieh et al. | |
| 7,497,334 B2 | 3/2009 | Tyvoll et al. | |
| 7,534,336 B2 | 5/2009 | Volkel et al. | |
| 7,584,857 B2 | 9/2009 | Bohm et al. | |
| 7,770,738 B2 | 8/2010 | Tabata et al. | |
| 2002/0130068 A1 | 9/2002 | Fassbender et al. | |
| 2004/0038249 A1 | 2/2004 | Darteil et al. | |
| 2005/0183996 A1 | 8/2005 | Zemel et al. | |
| 2005/0263448 A1 | 12/2005 | Heist et al. | |
| 2006/0087918 A1 | 4/2006 | Ji et al. | |
| 2006/0118479 A1 | 6/2006 | Shevkoplyas et al. | |
| 2006/0158640 A1 | 7/2006 | Molter et al. | |
| 2006/0240964 A1 | 10/2006 | Lolachi et al. | |
| 2008/0128331 A1 | 6/2008 | Lean et al. | |
| 2009/0014360 A1 | 1/2009 | Toner et al. | |
| 2009/0050538 A1 | 2/2009 | Lean et al. | |
| 2009/0114607 A1 | 5/2009 | Lean et al. | |
| 2009/0283452 A1 | 11/2009 | Lean et al. | |
| 2009/0283455 A1 | 11/2009 | Lean et al. | |

FOREIGN PATENT DOCUMENTS

| | | |
|---|---|---|
| DE | 2809630 | 9/1978 |
| DE | 2829592 | 9/1978 |
| DE | 2929139 | 1/1981 |
| DE | 37 36 504 C1 | 3/1989 |
| DE | 42 00 802 A1 | 7/1993 |
| DE | 19855256 | 6/2000 |
| DE | 100 01 737 C1 | 10/2001 |
| DE | 102004039182 | 2/2006 |
| EP | 0448973 | 10/1991 |
| EP | 1407807 | 4/2004 |
| EP | 1681549 | 7/2006 |
| EP | 1795894 | 6/2007 |
| EP | 1942329 | 7/2008 |
| EP | 2060312 | 5/2009 |
| FR | 2571354 A1 | 4/1986 |
| FR | 2753392 | 3/1998 |
| GB | 330163 | 6/1930 |
| GB | 386080 A | 1/1933 |
| GB | 934423 | 8/1963 |
| GB | 1039485 | 8/1966 |
| GB | 2012193 | 7/1979 |
| GB | 2024038 | 1/1980 |
| GB | 2098091 | 11/1982 |
| GB | 2209969 | 6/1989 |
| JP | 50-125536 | 10/1975 |
| JP | 58-119306 | 7/1983 |
| JP | 60071083 A | 4/1985 |
| JP | 60-125288 | 7/1985 |
| JP | 60-129186 | 7/1985 |
| JP | 63319017 | 12/1988 |
| JP | 5007795 A | 1/1993 |
| JP | 09-299712 | 11/1997 |
| JP | 2001121039 | 8/2001 |
| JP | 2001-286872 | 10/2001 |
| JP | 2007-069179 | 3/2007 |
| JP | 2007069179 A | 3/2007 |
| JP | 9299712 A | 11/2007 |
| JP | 04504975 B2 | 7/2010 |
| KR | 20030003206 A | 1/2003 |
| WO | WO8603140 | 6/1986 |
| WO | WO 8810239 A1 | 12/1988 |
| WO | WO 98/38134 A1 | 9/1998 |
| WO | WO2004113877 | 12/2004 |
| WO | WO2006056219 | 6/2006 |

OTHER PUBLICATIONS

European Search Report, dated Mar. 10, 2009.
Singapore Search Report, dated Apr. 1, 2009.
Yang et al., "Particle Separation in Microfluidic Channels Using Flow Rate Control," Proceedings of IMECE2004-60862, pp. 1-6, Anaheim, CA, Nov. 13-19, 2004.
Takagi et al., "Continuous Particle Separation in a Microchannel having Asymmetrically Arranged Multiple Branches,", Lab on a Chip 2005, Lab Chip, 2005, 5, pp. 778-784, May 19, 2005.
Zhang et al., "Continuous Flow Separation of Particles Within an Asymmetric Microfluidic Device," Lab on a Chip 2006, Lab Chip, 2006, 6, pp. 561-566, Mar. 13, 2006.
Narayanan et al., "A Microfabricated Electrical SPLITT System," Lab on a Chip 2006, Lab Chip, 2006, 6, pp. 105-114, Dec. 5, 2005.

(56) References Cited

OTHER PUBLICATIONS

Kapishnikov et al., "Continuous Particle Size Separation and Size Sorting Using Ultrasound in a Microchannel," Journal of Statistical Mechanics: Theory and Experiment, P01012, pp. 1-15, 2006.
Brenner, "Polymer Fabrication and Microfluidic Unit Operations for Medical Diagnostics on a Rotating Disk," Dissertation at Institute of Microsystems, University of Frieburg, Dec. 2005.
Ookawara et al., "Feasibility Study on Concentration of Slurry and Classification of Contained Particles by Microchannel," Chemical Engineering Journal, v. 101, pp. 171-178, 2004.
Matthews et al., "Particle Flow Modelling on Spiral Concentrators: Benefits of Dense Media for Coal Processing?," Second International Conference on CFD in the Minerals and Process Industries, CSIRO, Melbourne, Australia, pp. 211-216, Dec. 6-8, 1999.
Shi et al., "Radial Capillary Array Electrophoresis Microplate and Scanner for High-Performance Nucleic Acid Analysis," Analytical Chemistry, vol. 71, No. 23, pp. 5354-5361, Dec. 1, 1999.
Tuval et al., "Neutrally Buoyant Particles and Bailout Embeddings in Three-Dimensional Flows," 5th International Summer School/ Conference Proceedings, Let's Face Chaos Through Nonlinear Dynamics (online), Jun. 30-Jul. 14, 2002 (retrieved on Jan. 21, 2009). Retrieved from the Internet: http://www.camtp.uni-mb.si/chaos/2002/reports/abstracts.shtml.
Gascoyne et al., "Particle Separation by Dielectrophoresis," Electrophoresis 2002, 23, pp. 1973-1983, Houston, Texas, 2002.
Bennett et al., "Combined Field-Induces Dielectrophoresis and Phase Separation for Manipulating Particles in Microfluidics," American Institute of Physics, vol. 82, No. 23, pp. 4866-4868, Dec. 8, 2003.
Inglis et al., "Continuous Microfluidic Immunomagnetic Cell Separation," American Institute of Physics, vol. 85, No. 21, pp. 5093-5095, Nov. 22, 2004.
Giddings, "Field-Flow Fractionation: Analysis of Macromolecular, Colloidal, and Particulate Materials," Science, vol. 260, pp. 1456-1465, Jun. 4, 1993.
Reschiglian et al., "Field-Flow Fractionation and Biotechnology," Trends in Biotechnology, vol. 23, No. 9, pp. 475-483, Sep. 9, 2005.
Segré et al., "Radial Particle Displacements in Poiseuille Flow of Suspensions," Nature Publishing Group, No. 4760, pp. 209-210, Jan. 21, 1961.
Segré et al., "Behaviour of Macroscopic Rigid Spheres in Poiseuille. Flow Part 2. Experimental Results and Interpretation," Weizmann Institute of Schence, Rehovoth, Israel, pp. 136-157, received Nov. 6, 1961 and in revised form Mar. 16, 1962.
Leighton et al., "The Lift on a Small Sphere Touching a Plane in the Presence of a Simple Shear Flow," Journal of Applied Mathematice and Physics (ZAMP), vol. 36, pp. 174-178, Jan. 1985.
Cherukat et al., "The Inertial Lift on a Rigid Sphere in a Linear Shear Flow Field Near a Flat Wall," J. Fluid Mech. 1994, vol. 263, pp. 1-18, Received Mar. 8, 1993 and in revised form Aug. 18, 1993.
Saffman, "The Loft on a Small Sphere in a Slow Shear Flow," J. Fluid Mech. 1965, vol. 22, Part 2, pp. 385-400, Received Oct. 29, 1964.

Rubinow et al., "The Transverse Force on a Spinning Sphere Moving in a Viscous Fluid," Institute of Mathematical Sciences, New York University, New York, pp. 447-459, Mar. 13, 1961.
Ho et al., "Inertial Migration of Rigid Spheres in two-Dimensional Unidirectional Flows," J. Fluid Mech. 1974, vol. 65, Part 2, pp. 365-400, Received Sep. 4, 1973.
Vasseur et al., "The Lateral Migration of a Spherical Particle in Two-Dimensional Shear Flows," J. Fluid Mech. 1976, vol. 78, Part 2, pp. 385-413, Received Dec. 4, 1975.
Feng et al., "Direct Simulation of Initial Value Problems for the Motion of Solid Bodies in a Newtonian Fluid. Part 2., Couette and Poiseuille Flows," J. Fluid Mech. 1994, vol. 277, pp. 271-301, Received Sep. 20, 1993 and in revised form May 11, 1994.
Asmolov, "The Inertial Lift on a Spherical Particle in a Plane Poiseuille Flow at Large Channel Reynolds Number," J. Fluid Mech. 1999, vol. 381, pp. 63-87, Received Feb. 28, 1997 and in revised form Sep. 10, 1998.
Asmolov, "The Inertial Lift on a Small Particle in a Weak-Shear Parabolic Flow," American Institute of Physics, vol. 14, No. 1, Jan. 2002.
Matas et al., "Inertial Migration of Rigid Spherical Particles in Poiseuille Flow," J. Fluid Mech. 2004, vol. 515, pp. 171-195, Received Apr. 17, 2003 and in revised form Apr. 19, 2004).
Yang et al., "Migration of a Sphere in Tube Flow," J. Fluid Mech. 2005, vol. 540, pp. 109-131, Received Mar. 30, 2004 and in revised form Apr. 13, 2005.
Michaelides, Hydrodynamic Force and Heat/Mass Transfer From Particles, Bubbles, and Drops—The Freeman Scholar Lecture, Journal of Fluids Engineering, vol. 125, pp. 209-238, Mar. 2003.
Cherukat et al., "Wall-Induced Lift on a Sphere," Int. J. Multiphase Flow, vol. 16, No. 5, 1990, pp. 899-907, Received Nov. 6, 1989 and in revised form Apr. 1, 1990).
Cherukat et al., "The Inertial Lift on a Rigid sphere Translating in a Linear Shear Flow Field," Int. J. Multiphase Flow, vol. 20, No. 2, 1994, pp. 339-353, Received Feb. 20, 1993 and in revised form Oct. 10, 1993.
Berger et al., "Flow in Curved Pipes," Ann. Rev. Fluid Mech. 1983, vol. 15, pp. 461-512, 1983.
Gupalo et al., "Velocity Field of a Liquid Stream in a Spiral Channel of Rectangular Cross Section," pp. 109-112. Translated from Izvestiya Adademii Nauk SSSR, Mekhanika Zhidkosti I Gaza, No. 1, pp. 131-136, Jan.-Feb. 1977. Original article submitted Jan. 8, 1976.
Dean, "Fluid Motion in a Curved Channel," Imperial College of Science, pp. 402-420, Jul. 31, 1928.
Sudarsan et al., "Multivortex Micromixing," PNAS, vol. 103, No. 19, pp. 7228-7233, May 9, 2006.
Xia et al., "Soft Lithography," Annu. Rev. Mater. Sci. 1998, vol. 28, pp. 153-184, 1998.
Sao et al., "Integrated Multiple Patch-Clamp Array Chip via Lateral Cell Trapping Junctions," American Institute of Physics, vol. 84, No. 11, pp. 1973-1975, Mar. 15, 2004.

* cited by examiner

| PARTICLE DIAMETER (μm) | $r^6/\lambda^4$ | $r^4/\lambda^2$ | $r^2$ | ESTIMATED HAZE (NTU) |
|---|---|---|---|---|
| 1 | 0.61 | 0.40 | 0.25 | 0.78 |
| 2 | 39.06 | 6.25 | 1.00 | 2.53 |
| 3 | 444.95 | 31.64 | 2.25 | 6.21 |
| 4 | 2500.00 | 100.00 | 4.00 | 12.70 |
| 5 | 9536.74 | 244.14 | 6.25 | 22.80 |
| 6 | 28476.56 | 506.25 | 9.00 | 37.10 |
| 7 | 71807.25 | 937.89 | 12.25 | 55.50 |
| 8 | 160000.00 | 1600.00 | 16.00 | 76.80 |
| 9 | 324365.85 | 2562.89 | 20.25 | 98.90 |
| 10 | 610351.56 | 3906.25 | 25.00 | 119.00 |
| LIGHT WAVELENGTH = 400 nm<br>NTU = NEPHELOMETRIC TURBIDITY UNITS<br>1,200 SPHERICAL PARTICLES PER MILLILITER FOR MONODISPERSE SUSPENSIONS ||||||

*FIG. 8*

| CITY WHERE PLANT IS LOCATED | RIVER SYSTEM FROM WHICH RAW WATER IS DRAWN | AVERAGE MONTHLY PRODUCTION (1,000 Gal.) | RAW WATER TURBIDITY | RAW WATER pH | CHEMICAL COST PER MILLION GALLONS | CHEMICAL COST PER MILLION GALLONS/ TURBIDITY UNIT |
|---|---|---|---|---|---|---|
| ARCHER CITY | RED | 8684 | 89.16 | 7.9 | 71.46 | 0.80 |
| BALLINGER* | COLORADO | 19201 | 16.74 | 7.8 | 20.21 | 1.21 |
| BIG SPRING | COLORADO | 177000 | 35.00 | 8.2 | 25.66 | 0.73 |
| BRENHAM | BRAZOS | 63925 | 6.22 | 7.8 | 133.53 | 21.47 |
| EDINBURGH* | RIO GRANDE | 130380 | 9.30 | 7.8 | 32.63 | 3.51 |
| HARLINGEN 1* | RIO GRANDE | 190460 | 36.30 | 8.2 | 197.51 | 5.46 |
| HARLINGEN 2* | RIO GRANDE | 114730 | 27.90 | 8.2 | 286.14 | 10.26 |
| HENRIETTA | RED | 15654 | 25.75 | 8.2 | 134.65 | 5.23 |
| LUBBOCK* | BRAZOS | 881930 | 7.34 | 8.4 | 32.32 | 4.40 |
| TEMPLE | BRAZOS | 416630 | 5.85 | 7.7 | 58.30 | 9.97 |
| WACO 1 | BRAZOS | 343870 | 11.22 | 7.8 | 34.88 | 3.11 |
| WACO 26 | BRAZOS | 305730 | 9.79 | 7.8 | 32.23 | 3.29 |
| MEAN 12 PLANTS | | 222350 | 23.05 | 8.0 | 88.38 | 5.79 |

* DENOTES PLANT WITH POTENTIAL OR ACTUAL GROUND WATER CONTAMINATION AS REPORTED BY THE TEXAS WATER COMMISSION [1989].

WATER RESOURCES RESEARCH, 34(4), 849-854 (1998)

TURBIDITY REDUCTION
43,300 x 23 x $5.79 = $5.766 M/DAY
($2.104 B/YEAR)

*FIG. 9*

REMOVING 1-3 MICRONS PIN FLOC ELIMINATES FLOCCULATION STEP AND HALVES PROCESS TIME

COAGULATION AND SEDIMENTATION TIMES

| PARTICLE SIZE a(microns) | COAGULATION TIME (min.) | SEDIMENTATION VELOCITY (cm/s) | SEDIMENTATION TIME (min.) |
|---|---|---|---|
| 0.03 | 0.00 | 1.029e-8 | 9.873e8 |
| 1.00 | 20.00 | 1.143e-5 | 8.886e6 |
| 3.00 | 26.27 | 1.029e-4 | 98,736.63 |
| 30.00 | 39.40 | 1.029e-2 | 987.37 |
| 50.00 | 42.31 | 2.858e-2 | 355.45 |
| 70.00 | 44.23 | 5.602e-2 | 181.35 |
| 100.00 | 46.27 | 0.114 | 88.86 |
| 300.00 | 52.53 | 1.029 | 9.87 |

| US DAILY WATER USAGE 2000 | | |
|---|---|---|
| APPLICATION | VOLUME (mgd) | PERCENTAGE (%) |
| Thermoelectric Power | 195,000 | 48.00 |
| Public Supply | 43,300 | 10.60 |
| Irrigation | 137,000 | 33.58 |
| Domestic | 3,590 | 0.88 |
| Livestock | 1,760 | 0.43 |
| Aquaculture | 3,700 | 0.91 |
| Industrial | 19,700 | 4.83 |
| Mining | 3,490 | 0.86 |
| TOTALS | 408,000 | 100.00 |
| Source: USGS Water Usage Report 2000 | | |

ASSUME FLOCCULATION COST IS 50% OF ALL CHEMICAL COST 43,300 × $88.38 × 0.50 = $1.913 M/DAY ($698.4 M/YEAR)

FIG. 10(b)

DEVICE AND METHOD FOR DYNAMIC PROCESSING IN WATER PURIFICATION

CROSS REFERENCE TO RELATED PATENTS AND APPLICATIONS

This application is related to co-pending, commonly assigned U.S. patent application Ser. No. 11/606,460, filed Nov. 30, 2006, entitled "Particle Separation and Concentration System," and commonly assigned, co-pending U.S. patent application Ser. No. 11/936,729, filed on Nov. 7, 2007, entitled "Fluidic Device and Method for Separation of Neutrally Buoyant Particles," and naming Lean et al. as inventors.

BACKGROUND

Conventional municipal water treatment (MWT) includes multi-stage filtration and sequential process steps for coagulation, flocculation, and sedimentation. Typically, a minimum of two stages of filtration must include coarse 2-3 mm mesh filters at the inlet and 20-40 µm multi-media filters for finishing although many utilities have more intermediate filtration steps. The hydraulic retention time (fluid residence time) in the combined coagulation-flocculation-sedimentation process can be 5-10 hours long, depending on the quality of the source water.

With reference now to FIG. 1, a conventional water treatment facility is illustrated. This, of course, is merely an exemplary system. As shown, a system 10 includes a source 12 of any of a variety of types of fluid such as surface water, ground water, waste water, brackish water, seawater . . . etc. This water is fed to a screen filter 14—which is typically operative to filter out particles in the 1 mm to 3 mm range. After these relatively large particles are removed, a pH adjustment is made to the water and potassium permanganate ($KMnO_4$) is added to the supply in a carbon reactor/mixer 16. This chemical is typically added for taste and odor control. Other substitutes may include ozone and other oxidizing agents. Next, chlorine is added to the supply and mixed in a mixer 18. Flash mixing wherein coagulants (e.g., Alum, $FeCl_3$, ACH, etc.) are added is then performed in a flash mixer 20. Flocculants—made of long chain polymers with a high molecular weight—are added at a flocculation stage and mixed in a slow mixer 22. The supply is then sent to a sedimentation tank 22 where particles settle out of the effluent as a result of gravitational forces. The flow from the sedimentation tank is then provided to a multimedia filter 26 which operates to remove remaining small particles. The output of the system can then be used for a variety of purposes. In one form, chlorine is added to the output. The multimedia filter is frequently backwashed, and the backwash is optionally fed back to the water source. In this backwash, or feedback, path, a dewatering stage 28 may be provided whereby water is provided back to the source and sludge is removed.

As noted above, the water purification process described requires a substantial amount of time. With reference now to FIG. 2, it is seen from an example flow 50 that the basic steps include rapid mix (including coagulation), flocculation, sedimentation, and filtration. As shown, the rapid mix stage 52 takes 30 seconds to 2 minutes to complete. The flocculation stage 54 requires 20 to 45 minutes of processing time. Sedimentation 56, or any other alternative solid removal process, typically requires at least 1 to 4 hours (and possibly up to 10 hours) of processing. Last, filtration 58 also requires a definitive amount of time. The extended time periods are not only a problem for municipal-type purification systems but also water purification systems that are used in other environments, such as a lab environment.

Therefore, it would be desirable to have available an alternative water treatment system that can more efficiently and effectively purify water.

INCORPORATION BY REFERENCE

This application is related to co-pending, commonly assigned U.S. patent application Ser. No. 11/606,460, filed Nov. 30, 2006, entitled "Particle Separation and Concentration System" and commonly assigned, co-pending U.S. patent application Ser. No. 11/936,729, filed on Nov. 7, 2007, entitled "Fluidic Device and Method for Separation of Neutrally Buoyant Particles," and naming Lean et al. as inventors which are both incorporated herein in their entirety by this reference.

BRIEF DESCRIPTION

In one aspect of the presently described embodiments, the system comprises an inlet to receive water from a source, a filter stage operative to filter first particles, a mixing stage operative to receive and coagulate the filtered water, a spiral stage operative to receive the coagulated water, treat with flocculant, and separate second particles from the water, a second filter stage operative to filter third particles from the water; and, an outlet.

In another aspect of the presently described embodiments, the first filter stage is a screen filter.

In another aspect of the presently described embodiments, the spiral stage is incorporated in a single spiral device.

In another aspect of the presently described embodiments, the mixing stage is incorporated in a single spiral device.

In another aspect of the presently described embodiments, the mixing stage is incorporated in a flash mixer.

In another aspect of the presently described embodiments, the spiral stage is incorporated in a first spiral device to receive the coagulated water and treat with flocculant and a second spiral device to separate second particles from the water.

In another aspect of the presently described embodiments, the second filter stage is a filter device.

In another aspect of the presently described embodiments, the system further comprises a feedback path to the source.

In another aspect of the presently described embodiments, the feedback path includes a spiral stage for dewatering.

In another aspect of the presently described embodiments, the first particles are approximately 1-3 mm in diameter.

In another aspect of the presently described embodiments, the second particles are approximately 5 µm or larger in diameter.

In another aspect of the presently described embodiments, the third particles are 0.5 µm or larger in diameter.

In another aspect of the presently described embodiments, the method comprises receiving water from a source, filtering the water to remove first particles, flash mixing the filtered water with chlorine and coagulant, slow mixing output of the first spiral stage with flocculant in a spiral stage, separating second particles in the spiral stage, and, filtering the output of the spiral stage to remove third particles.

In another aspect of the presently described embodiments, the filtering of the water to remove first particles comprises passing the water through a screen.

In another aspect of the presently described embodiments, the slow mixing and separating are accomplished in a single separation device.

In another aspect of the presently described embodiments, the filtering of the output of the spiral stage comprises passing the output through a filter having multiple media or membrane filters.

In another aspect of the presently described embodiments, the method further comprises dewatering in a feedback path.

In another aspect of the presently described embodiments, the first particles are approximately 1-3 mm in diameter.

In another aspect of the presently described embodiments, the second particles are approximately 5 µm or larger in diameter.

In another aspect of the presently described embodiments, the third particles are 0.5 µm or larger in diameter.

BRIEF DESCRIPTION OF THE DRAWINGS

FIG. 8 is a chart showing a relation for particle size to NTU reading.

FIG. 9 is a chart showing typical cost of chemicals for coagulation and flocculation.

FIGS. 10(a) and 10(b) show coagulation and sedimentation times and savings calculation.

DETAILED DESCRIPTION

The presently described embodiments represent a transformational approach to water treatment that incorporates membrane-free filtration with dynamic processing of the fluid to significantly reduce treatment times, chemical cost, land use, and operational overhead. The approach provides hybrid capabilities of filtration together with chemical treatment as the water is transported through various spiral stages.

Features of the system include, but are not limited to, the following:

1) Use of a spiral particle extraction capability as a front-end to lighten the TSS (total suspended solids) loading on the system. The flash mixing at the front-end of the process also enhances chemical kinetics and results in a more complete reaction;

2) Use of a dynamic transport capability in narrow flow channels where the high rate of shear from rapid parabolic flow and coagulants results in seed particles of uniform size which are ideal for accelerated agglomeration kinetics;

3) Allowance for removal of pin floccs (particle size at transition point between the end of coagulation and start of flocculation) as small as 5 µm by the spiral device rather than rely on the conventional practice of allowing them to agglomerate to hundreds of microns in size before settling out in the sedimentation basin. This process also results in accelerated agglomeration;

4) Allow for the entire or near elimination of the flocculation and sedimentation steps together with all the attendant chemicals. This will also allow for reduced land use and maintenance labor; and, 5) Allow for gradual dosage of chemicals.

Figure 1:
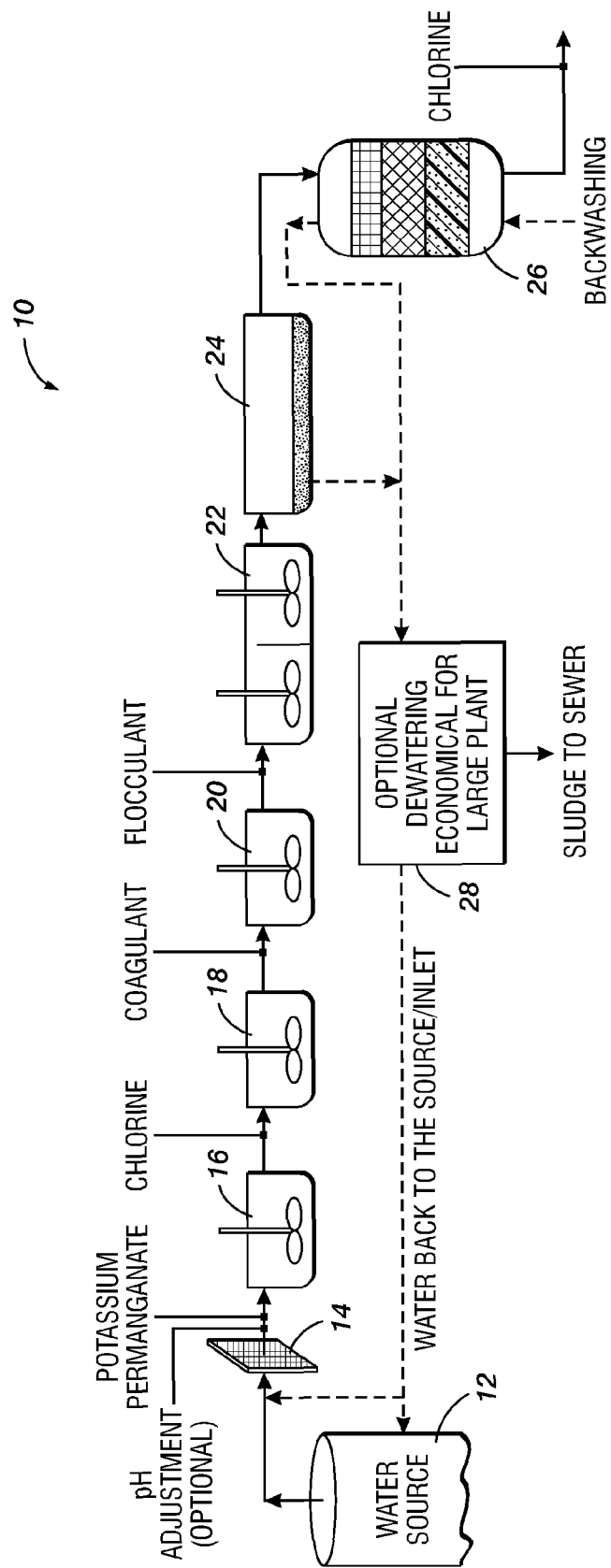
FIG. 1 is a schematic diagram showing a conventional water treatment.
Figure 2:
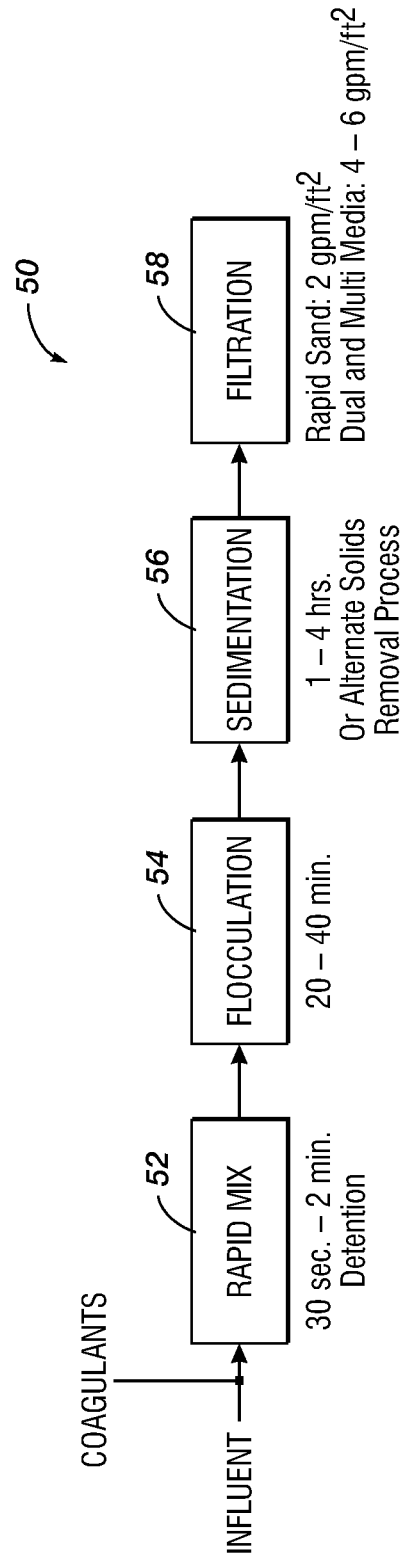
FIG. 2 is a typical timing diagram for stages of coagulation, flocculation, and sedimentation in a conventional water treatment system.
Figure 3A:
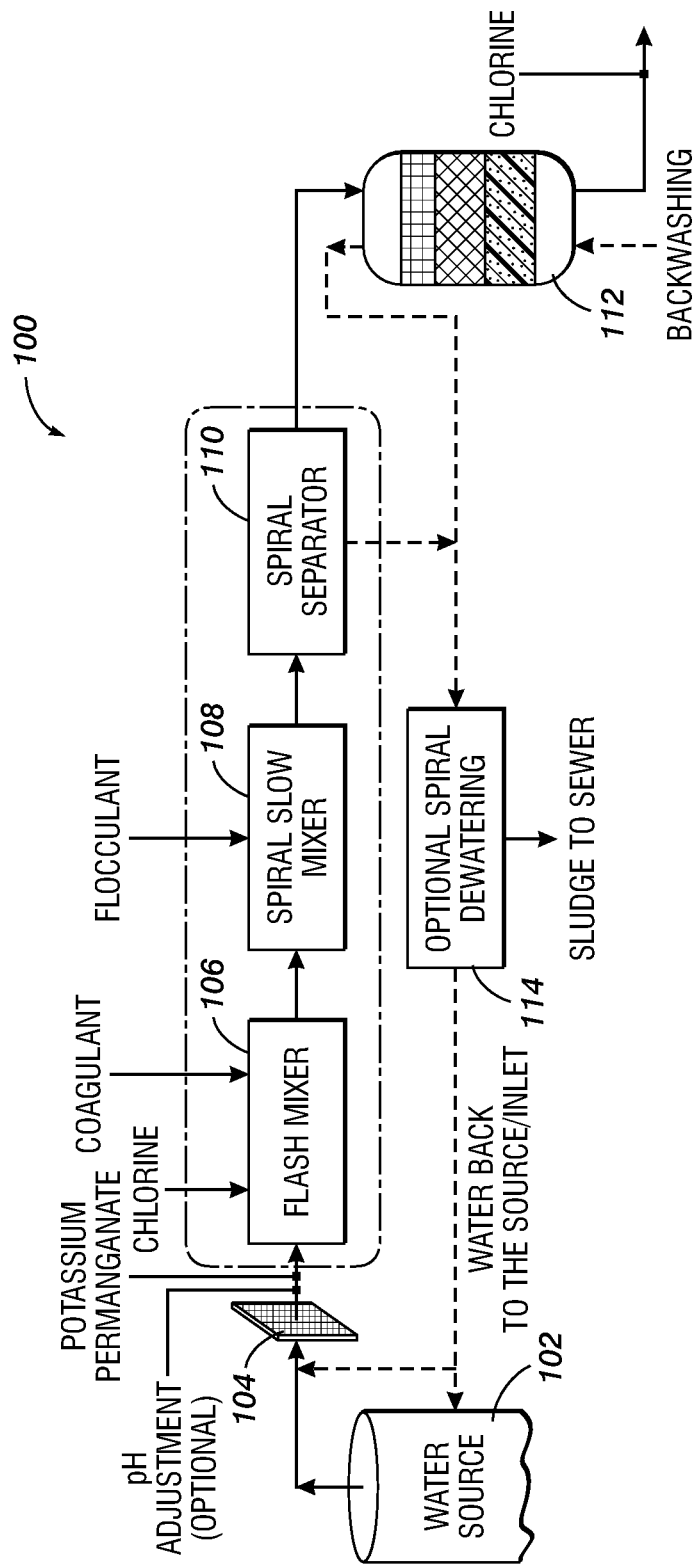
FIGS. 3(a) and 3(b) illustrate systems according to the presently described embodiments.

In this regard, FIGS. 3(a) and (b) show schematics of example water treatment plants according to the presently described embodiments. These embodiments illustrate replacing selected components of the conventional system with components shown within the inscribed ellipse of FIG. 3(a). Elimination of, for example, the flocculation step results in a reduced footprint and a reduced use of chemicals.

As shown in FIG. 3(a), a system 100 is used to process water from a water source 102. The system includes a screen filter 104 operative to remove relatively large particles from the supply. These particles are typically in the range of 1 mm to 3 mm. Other larger particles and objects (e.g., fish, trash, etc.) are also filtered out through this screen. An optional pH adjustment may be made to the fluid as it proceeds through the system.

The system 100 further includes a first stage 106, a second spiral stage 108 and a third spiral stage 110. It is to be appreciated that the spiral stages may be incorporated within a single spiral separator device. As an alternative, any one of the spiral stages may be implemented in its own unique spiral separator device. In any case, the first stage 106 is a flash mixing stage. It should be understood that this stage may take the form of a flash mixer, a turbulent mixer or another spiral mixing stage. If a spiral mixing stage is used here, a sufficient amount of turbulence is introduced into the spiral stage to achieve sufficient mixing. The second spiral stage 108 is a spiral slow mixing stage. And, the third spiral stage is a spiral separating stage. In the third stage, particles of 5 µm or larger are typically separated from the fluid.

A filter 112 is also provided to the system. The filter 112 may take a variety of forms. However, in one form, it comprises multiple filtering media or membrane filters to, for example, conform to EPA mandates for physical barriers. The particles that are filtered by the filter device 112 are typically in the 0.5 µm or larger range. Also shown in the system 100 is an optional spiral stage 114 that provides for dewatering. In this stage, the spiral dewatering device receives backwash fluid from the filter 112 and separates sludge from water which is provided back to the water source.

In operation, the system 100 receives water from the source 102 which may include ground, surface, brackish, sea or waste water. This water is filtered through the screen filter 104 to remove a first group of particles in the noted range. The water supply is then flash mixed in stage 106 along with the potassium permanganate, coagulant, and chlorine. Next, flocculant is slow mixed into the supply in spiral slow mixing stage 108. In the third spiral stage 110, another group of particles is separated out from the supply. As noted, these particles are typically in the 5 µm or larger range. Then, the filter 112 filters out a third group of particles that are generally smaller and are in the range of 0.5 µm or larger. The output is then transmitted on for any of a variety of uses.

It should also be understood that the filter 112 may be subjected to a backwashing process which will provide fluid to an optional spiral dewatering stage 114 to, again, separate sludge from water that is provided back to the water source.

Figure 3B:
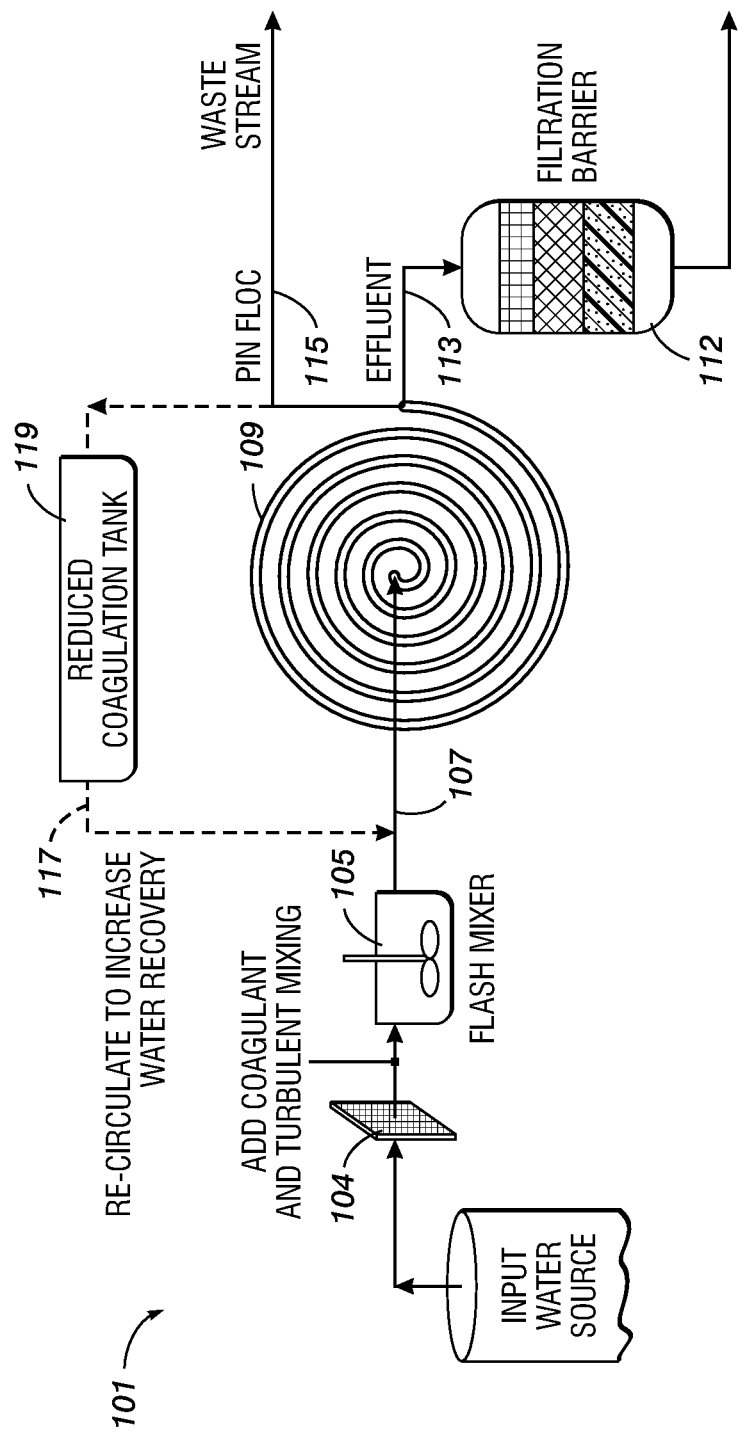

With reference now to FIG. 3(*b*), another embodiment is illustrated that uses a flash mixer and a single spiral device to achieve desired separation. As shown, a system 101 includes screen filter 104 operative to filter out relatively large particles from the supply (e.g., particles/objects in the 1 mm to 3 mm range or larger). Also shown is a flash mixer 105 operative to flash mix coagulant and other suitable chemicals into the supply. Turbulent mixing may be achieved in the flash mixer 105 or in a separate device. A spiral device 109 is shown. The spiral device 109 includes an inlet 107 and outlets 111 and 113. The spiral device 109 effectively replaces the flocculation and sedimentation stage of conventional systems and is designed to achieve substantially similar objectives through the use of spiral separation. Flocculant may be added at this stage as well.

The outlet 111 connects to a waste stream 115 which, as shown, includes particles greater than 1-5 micrometers in size. Also shown is an optional recirculation path 117 that may have disposed therein a reduced coagulation tank 119. The recirculation path connects with the inlet 107 of the device 109. The outlet 113 connects to a filter 112, which operates and is configured as described above in connection with FIG. 3(*a*).

Figure 4A:
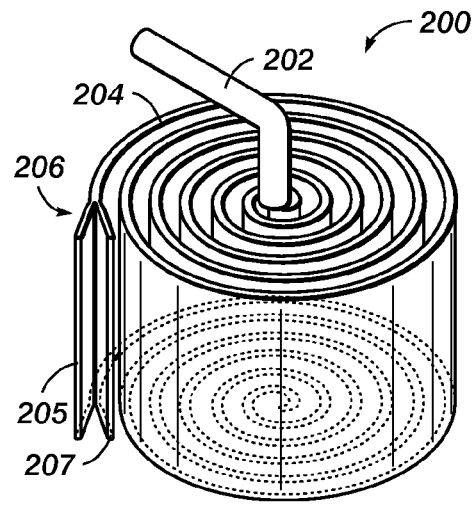
FIGS. 4(a)-(c) illustrate an example of a spiral device designed for 1 um particle cut-off and 100 L/min throughput.
Figure 4B:
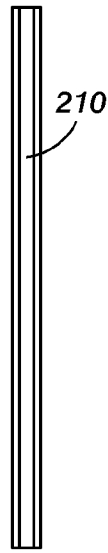
Figure 4C:
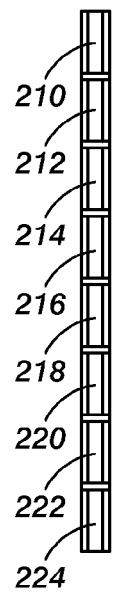

An example of spiral wound prototype of a spiral device is shown in FIG. 4(*a*). The device is designed for 100 L/min throughput. As shown, FIG. 4(*a*) illustrates a spiral device 200 that includes an inlet 202 and a body portion 204 that comprises at least one spiral channel that connects to an outlet 206. The outlet 206 comprises a split channel egress—a single channel egress 205 for effluent and a single channel egress 207 for concentrate. As shown in FIG. 4(*b*), the body 204 of the spiral device may be comprised of a single spirally wound channel 210. As an alternative, FIG. 4(*c*) shows an embodiment wherein the body 204 is divided into eight parallel channels 210, 212, 214, 216, 218, 220, 222, and 224. It is to be understood that other numbers of parallel channels are possible depending on desired throughput, manufacturing option, and fabrication cost.

The spiral device 200 may be structured so that a single spiral stage, as noted above, or multiple contemplated spirals stages are incorporated therein. Of course, the objectives of flash mixing, slow mixing and separating are taken into account in the design of each of the stages. For example, the channel width and flow velocity of each of the stages is taken into consideration in the spiral device implementation. In this regard, it should also be understood that the spiral device shown is merely an example. Any similar spiral device may be implemented to achieve the objectives of the presently described embodiments. For example, spiral devices described in U.S. application Ser. No. 11/606,460, filed Nov. 30, 2006, entitled "Particle Separation and Concentration System," or U.S. patent application Ser. No. 11/936,729, filed on Nov. 7, 2007, entitled "Fluidic Device and Method for Separation of Neutrally Buoyant Particles," and naming Lean et al. as inventors which are incorporated in their entirety herein by this reference, may be used. It should be appreciated that any suitable material may be used to implement the spiral devices of the contemplated system.

Further, the dimensions of the spiral channel may vary depending on the implementation. In one form, however, the diameter of the spiral device is 12 inches and the height may vary from 1 inch to 16 inches. The dimensions may have an impact on pressure and output power of the system. Likewise, dimensions of the actual channels may impact pressure and power output. Generally, more pressure (which can be a result of a narrow channel) will result in more power.

Figure 5:
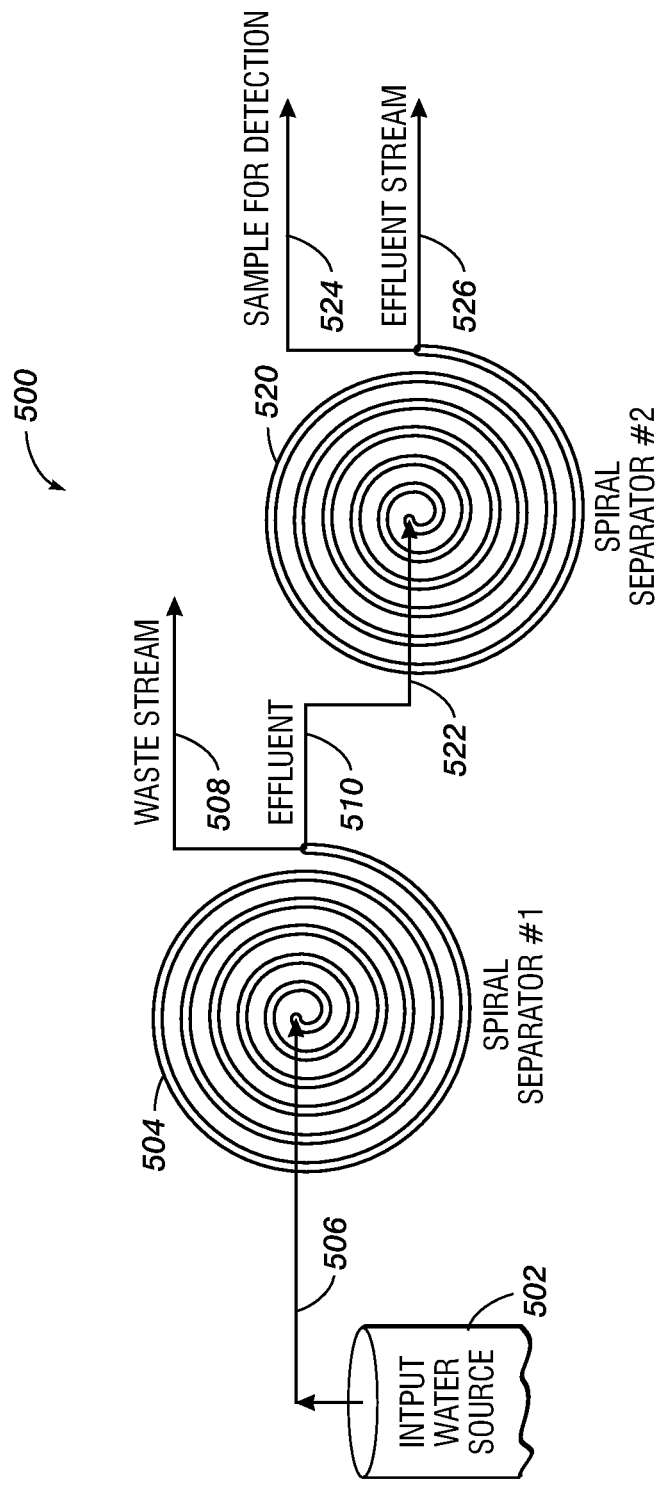
FIG. 5 illustrates another embodiment.

Also, the device may be cascaded and/or placed in parallel to achieve greater control of the output and/or greater throughput through the system. As a mere simple example used for explanatory purposes, with reference now to FIG. 5, a further embodiment to the presently described embodiments is shown. In this embodiment, a purification system 500 includes a two-stage spiral separation system to isolate particles of different sizes. In the example system shown, the particles are isolated in a 1 to 10 micrometer range. As shown, the system includes an input water source 502 connecting to a spiral separator 504 having an inlet 506, as well as a first outlet 508 and a second outlet 510. The second outlet 510 is connected to a second spiral separator 520 by way of an inlet 522. The spiral separator 520 includes a first outlet 524 and a second outlet 526 as shown.

In operation, the system 500 with the cascaded spiral stages facilitates a first separation of particles between those of greater than 10 micrometers being output from the first spiral separator in a waste stream and particles less than 10 micrometers being input to the second spiral separator 520 for further processing. The second spiral separator then separates particles greater than 1 micrometer and outputs fluid within which those particles reside by way of outlet 524. The remaining fluid or effluent is output through outlet 526. In this manner, the system 500 is able to isolate particles between 1 and 10 micrometers for various sampling processing. This concept can be extended by continued cascading of spiral structures with smaller size cut-offs to achieve fractionation of particles with decreasing size ranges.

Figure 6A:
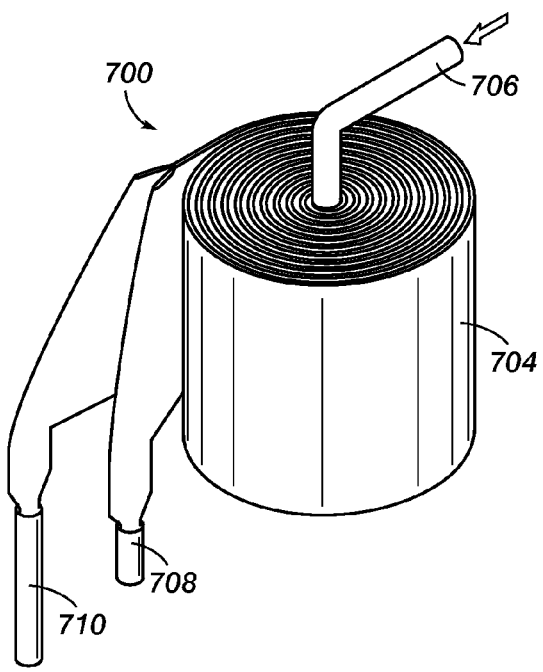
FIGS. 6(a) and 6(b) illustrate still another embodiment.
Figure 6B:
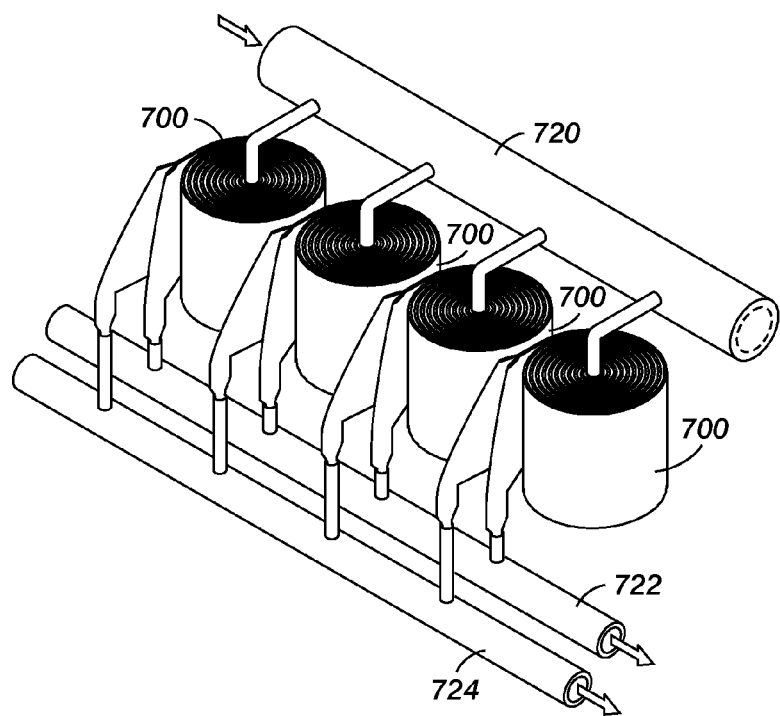

With reference to FIGS. 6(*a*) and 6(*b*), an example parallel system is shown. The embodiment of FIG. 6(*a*) shows a spiral device 700 that is a spiral wound device. Other types of spiral devices may also be used—this is simply an example. In this regard, other examples of spiral device implementations are shown in and commonly assigned, co-pending U.S. patent application Ser. No. 11/936,729, filed on Nov. 7, 2007, entitled "Fluidic Device and Method for Separation of Neutrally Buoyant Particles," and naming Lean et al. as inventors.

This device 700 includes a spirally wound body 704 having inlet 706, a first outlet 708 and a second outlet 710. The device 700, as shown in FIG. 6(*b*), may be disposed in a system wherein a plurality of devices 700 are connected in parallel to a water inlet main 720 from a fluid manifold. Similarly, the first outlet lines for the devices are connected to a first outlet main 722. The second outlet lines of the devices 700 are connected to a second outlet main 724.

Figure 7A:
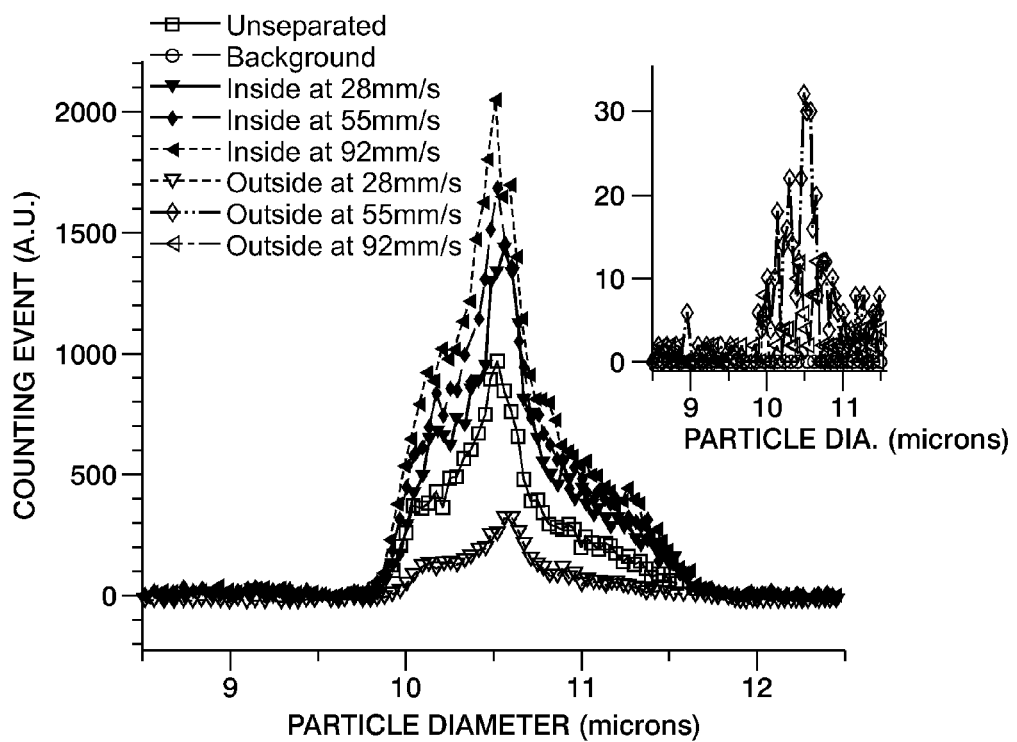
FIGS. 7(a) and 7(b) show a Coulter counter quantification of particle extraction.
Figure 7B:
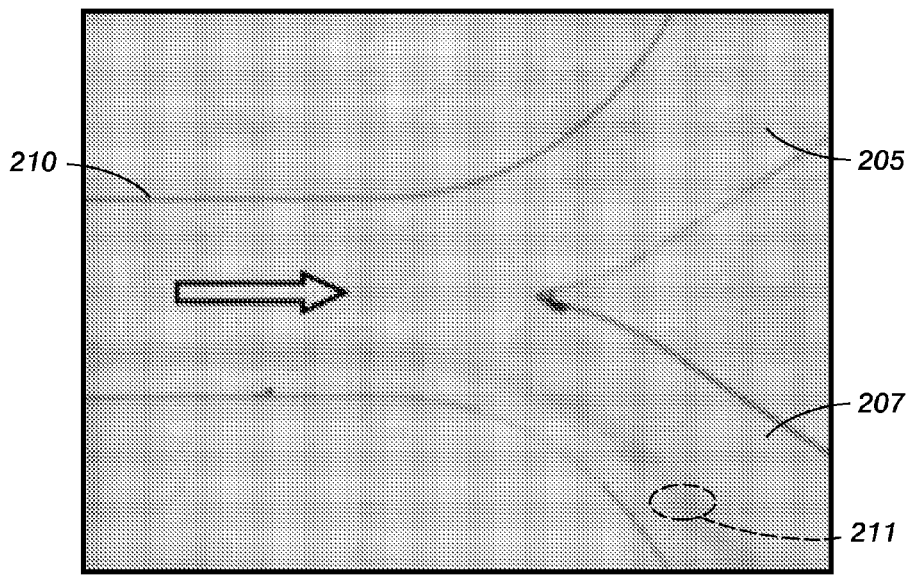

In FIG. 7(*a*), the quantified results using a Coulter Counter are shown where 300 times difference in concentration are seen at the particulate outlet at 99.1% extraction efficiency. The device can be further optimized to improve performance. In FIG. 7(*b*), the single channel 210 having the egress channel 205 and concentrate channel 207 is shown. The particles subject to separation are shown at 211.

FIG. 8 contains data to estimate the cost advantage in adoption of the presently described embodiments. Daily potable water usage in the US in 2000 is 43,300 MGD, representing 10.6% of total water consumption. Total chemical cost for coagulation and flocculation is $2B to $4B depending on source waters. The total annual US market for potable water is $41B. Turbidity in nephelometric units (NTU) is a uniform metric used in the water industry to determine the type and level of water treatment. This is a measure of optical transmission and scattering, and includes effects of particle size, density, and color. By using the spiral device to reduce particles in the effluent stream to sub-micron size, the turbidity is reduced to less than 0.78 NTU (FIG. 8). Using the data in FIG. 9, the reduction in turbidity of 23 NTUs would result in chemical costs of $2.1B per year (43,300×23×5.79=$5.766 M/day@2.104B/year). FIGS. 10(a) and 10(b) show the combined coagulation and sedimentation times based on estimated rates of agglomeration assuming that a 30 nm particle grows into a 1 μm particle in 20 minutes. For a combined coagulation and sedimentation time of less than 4 hours, a suitable particle size is 70 μm in 44 minutes. Assuming that flocculant costs are 50% of the total chemical cost, the savings in eliminating the flocculant step is $698M for the year. The numbers used here are representative of the chemical cost advantage of the spiral device. Other cost advantages include land cost and associated construction cost.

Dynamic processing of the water during transport through the various spiral stages refers to the use of coagulants and high shear rates to enhance agglomeration kinetics. Proof of concept is demonstrated in water treatment experiments using conventional jar tests with and without a spiral device. Jar tests are a standard lab-scale procedure for optimizing the aggregation/flocculation/sedimentation dosage and performance in the water treatment process. The type and amount of coagulant needed depends on the turbidity and native pH of the sample water. Our sample water had a turbidity level of between 25 to 30 NTU and a native pH value of about 9. The standard jar test is typically performed in three phases: In the first phase the liquid is stirred at a high rate (e.g. 275 to 280 rpm) during which the coagulant is added rapidly and the pH level of the sample is adjusted to a value of 9 using 1 N NaOH solution. In a second phase stirring is reduced to a moderate level (e.g. 25 to 30 rpm) that promotes some mixing, but allows the growth of larger floccs. In the third phase no external stirring takes place while the particles grow even larger and sediment out of solution.

In a first modification of the standard jar test (subsequently referred to as "step wise coagulant addition") we added the coagulant gradually in small doses, and adjusted the pH level to a value of 9 after each of these additions.

In a second modification (subsequently referred to as "modified jar test"), we pumped the fluid at a fixed flow rate through a spiral channel device during phase 1, and optionally during phase 2. The average shear rate inside the channel is approximately 300/s, corresponding to a conventional square jar. In comparison, the average shear rates inside the cylindrical glass beaker are 100/s and 10/s for the rapid and slow mixing phases, respectively.

Figure 11:
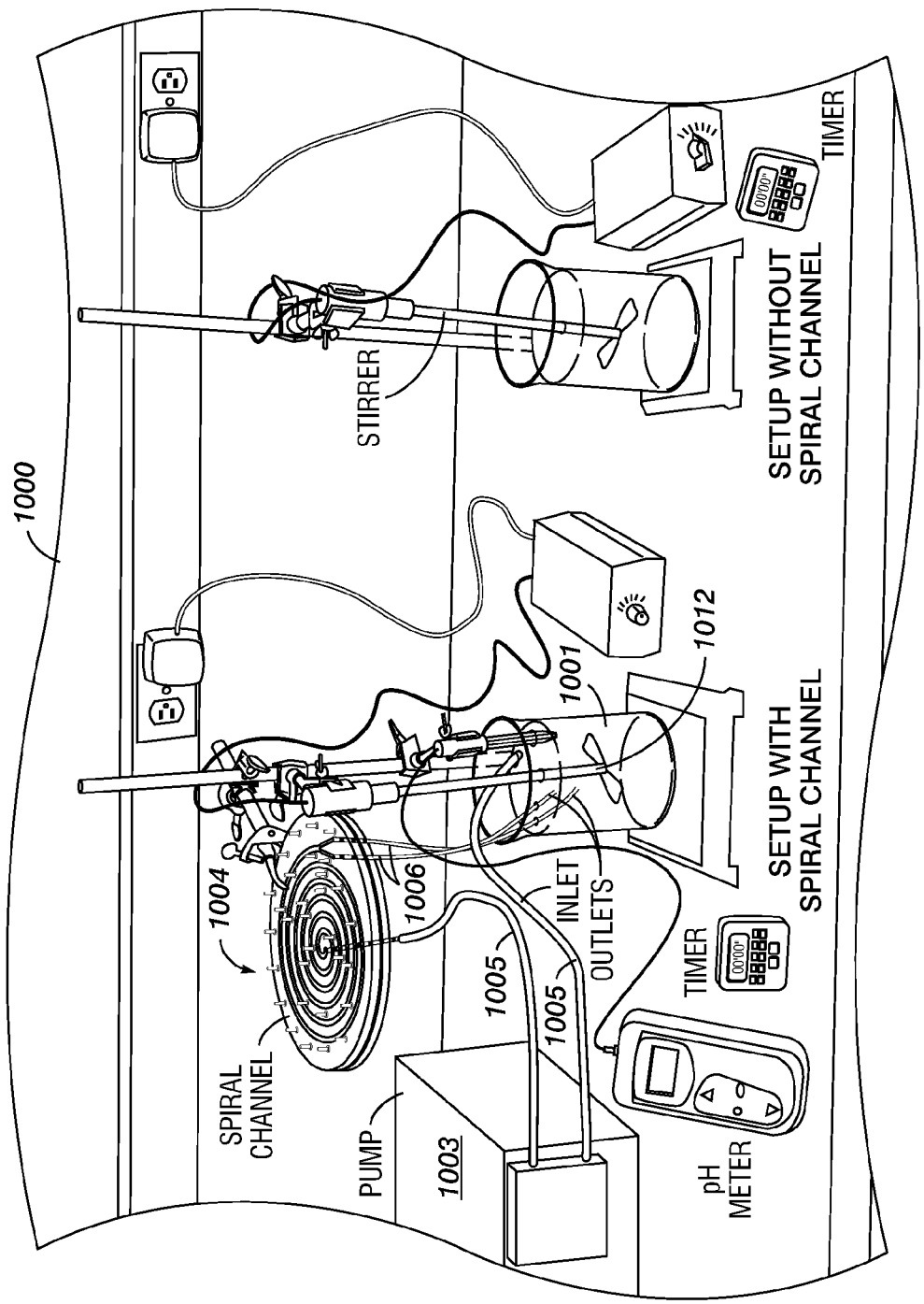
FIG. 11 illustrates an experimental setup for jar test experiments.

FIG. 11 shows the experimental setup 1000 for the jar tests. The aggregation and flocculation is performed in a 1000 ml glass beaker 1001. Mixing is achieved with a marine turbine rotor and/or stirrer 1012 that can be operated at different speeds. For the modified jar test, an additional peristaltic pump 1003 is used to push the liquid through a spiral channel 1004. The fluid inlet 1005 and outlet 1006 are submerged but well above the bottom to prevent sediment pickup. They are also located diametrically across from each other. In all the experiments turbidity values are recorded at frequent time intervals to monitor the progress of the flocculation. Other test devices in the set-up 1000 are also illustrated but not specifically discussed for ease of explanation.

There are different modes of aggregation: For small particles and/or slow stirring diffusion driven aggregation dominates. For larger particles (approx 1 μm and above) and/or higher mixing rates aggregation is shear dominated. In this case the maximum particle size is limited, since the shear force on the particles will increase with the aggregate size and eventually exceed the binding force between the individual (primary) particles. Most of the particle aggregation and flocculation happens while the sample liquid is not agitated or only moderately stirred. In this case, diffusion driven aggregation is the dominant growth mode for particles below a few μm in size. The total particle number decreases over time as $$N(t) = \frac{N_0}{1 + t/\tau}, \quad (1)$$

where $N_0$ is the particle concentration at the start of the experiment, t is time, and τ is the characteristic time scale of the process. For the diffusion driven (or perikinetic) aggregation τ depends on the fluid viscosity, temperature, the initial concentration of particles, and the type of aggregates that grow (loose and light vs. compact and dense).

Turbidity is a measure that includes both light absorption as well as light scattering off particles. Though it is not an exact measurement of the particle concentration or size distribution inside the sample liquid, we may still expect a similar time dependence of the NTU value, if particle scattering dominates the measured value. To compare measured turbidity vs. time curves with model predictions, we fit the experimental data to the function $$f(t) = \frac{b_0}{t + b_1} + b_2, \quad (2)$$

which was derived from Eqn. (1) by adding a time offset and a constant background:

$$NTU(t) = \frac{f(N_0)}{1 + 8\pi DrN_0(t - t_0)} + NTU_{base}, \quad (3)$$

with $$b_0 = \tau f(N_0); \; b_1 = \tau - t_0; \; b_2 = NTU_{base}. \quad (4)$$

Comparison of Standard Jar Test Vs. Step-Wise Coagulant Addition

To start the aggregation process coagulant is added and the pH is adjusted to an alkaline level of about 9. The rate and order of addition of these two substances to the sample liquid matter, as they define the ionic strength of the solution and the surface charge of the colloidal particles. Rapid mixing at this stage is essential, as the coagulant destabilizes the sample solution at the injection point and leads to the formation of very large, but loosely connected, floccs that increase the local viscosity substantially. Sufficient shear will break up this flocc network and promote good mixing of all the coagulant within the sample volume. In the standard jar test, all the coagulant is added first at a rapid rate, and then the pH is adjusted with 1 N NaOH solution. Here we compare this standard process with a step-wise procedure, where the coagulant is added in small amounts, followed by an immediate adjustment of the pH level with NaOH solution.

Figure 12:
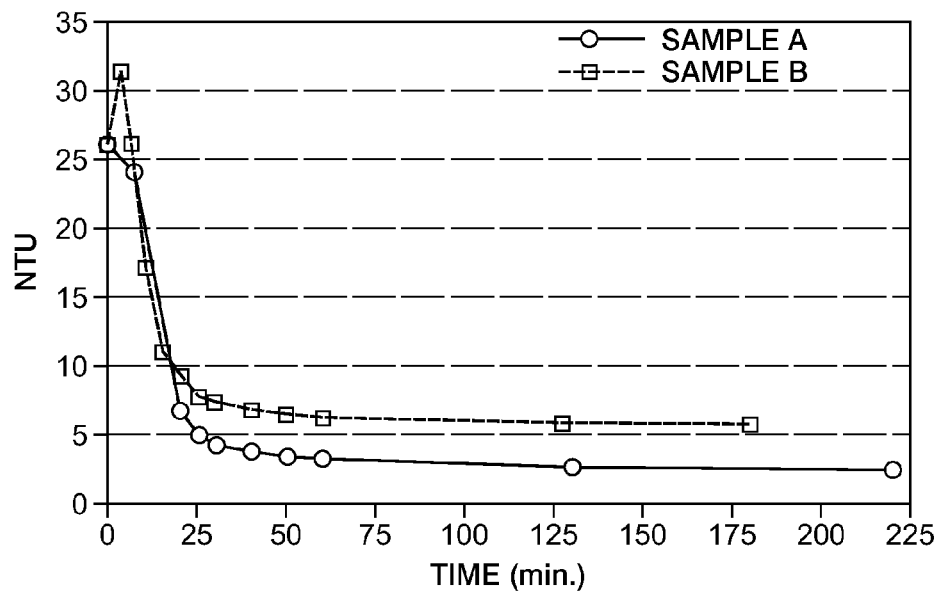
FIG. 12 shows turbidity as function of time for a jar tests with standard (sample B) and step-wise (sample A) coagulant addition.
Figure 13:
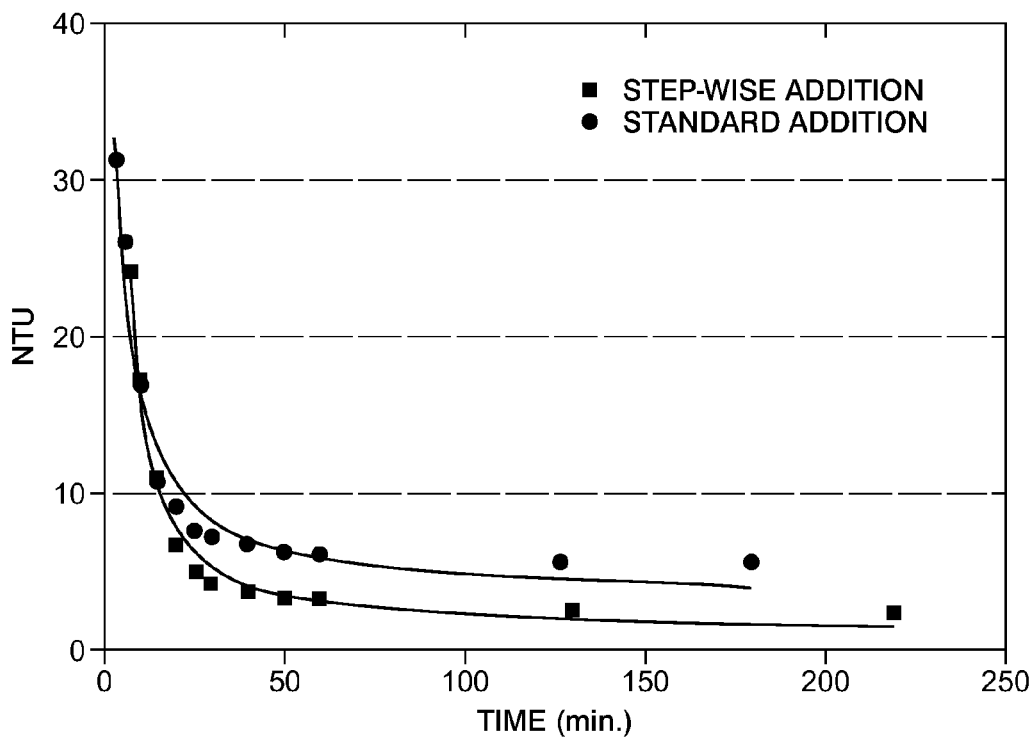
FIG. 13 is a comparison of the measured turbidity data for two different jar tests to a diffusion driven aggregation model.

FIG. 12 shows turbidity measurements as a function of time for both of these approaches on a dirt water sample using alum as the coagulant. The coagulant (80 mg/L) and NaOH is added at the beginning of a 5 minute rapid mixing phase, which is followed by a 25 minute slow mixing phase before the aggregates are allowed to settle. In the step-wise procedure, the coagulant was added in 8 steps of 10 mg, each. The total amount of NaOH solution needed to adjust the final pH to 9 varied between 1.1 ml for the standard to 1.2 ml for the step-wise coagulant addition process, suggesting a slight difference in either the ionic composition of the solution and/or the surface charge on the colloidal particles. From FIG. 10 we see that the step-wise addition of the coagulant followed by an immediate pH adjustment leads to a faster and more complete reduction of the turbidity. FIG. 13 shows a comparison of the experimental data with the model predictions. Eqn. (8) fits the data quite well, suggesting that the perikinetic model is a good description of the aggregation process in both of these jar test experiments. Assuming that we start with the same initial concentration of colloidal particles, and that we keep the temperature in both experiments the same, the faster aggregation rate for the step-wise coagulant process suggests that the colloidal particles form denser aggregates that diffuse faster through the solution. In other words, maintaining the pH close to the native pH of our sample water during coagulant addition helps in the formation of compact seed floccs that consequently lead to faster aggregation.

Comparison of Standard Jar Test Vs. Modified Jar Test

Figure 14A:
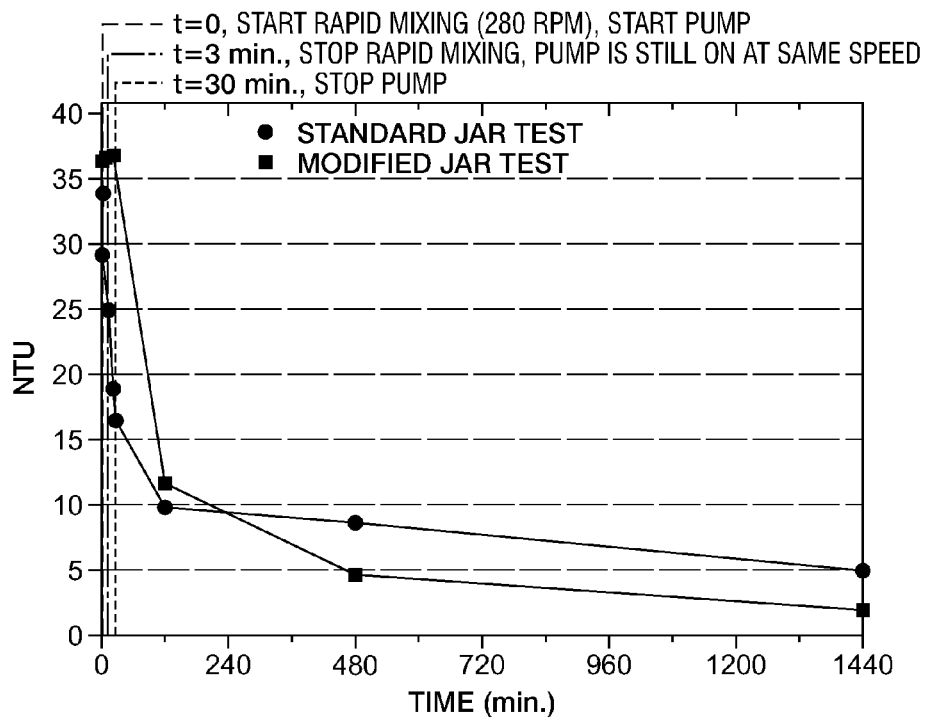
FIGS. 14(a) and 14(b) show NTU data for a typical jar test experiment. The blue data shows the standard jar test results, the pink curve the modified jar test results. The inset shows the turbidity measurements during the first 30 minutes.
Figure 14B:
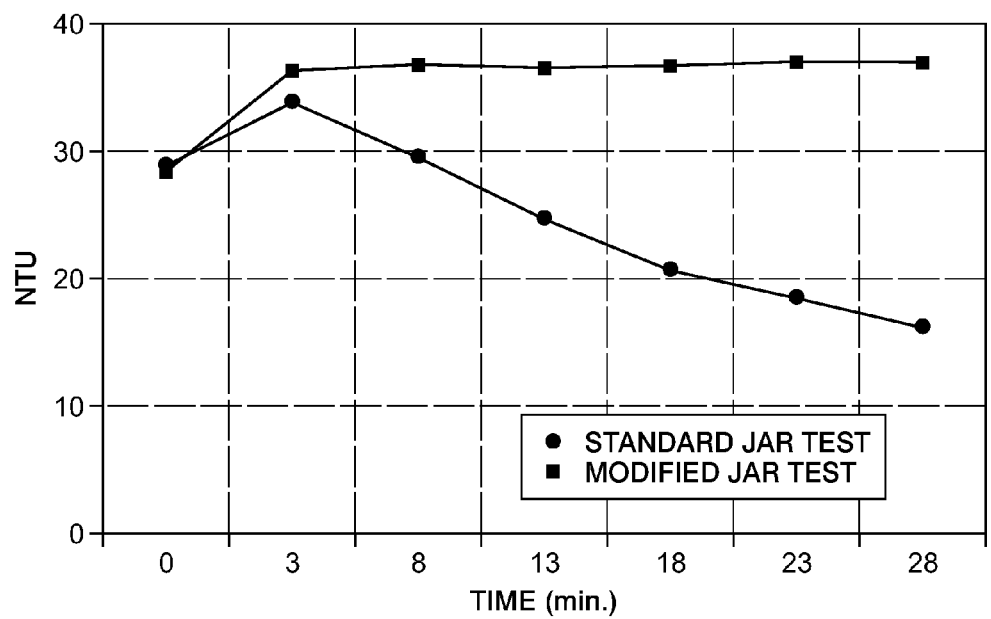

FIGS. 14(a) and (b) compare turbidity measurements for a standard and a jar test experiment which uses an additional spiral device. In this case, the sample was stirred initially at a high rate. After 3 minutes the stirrer was turned off. In the modified setup, the liquid was pumped at a flow rate of 333 ml/min through a spiral channel with a 3 by 3 mm$^2$ cross section for the 3 minutes of rapid stirring and for another 27 minutes afterwards. At this flow rate the average shear rate inside the channel is about an order of magnitude larger than the average shear rate inside the cylindrical beaker (during phase 1). For the standard jar test, NTU readings drop immediately after the rapid stirring was stopped (square annotated curve). In the modified jar test, the NTU readings stayed high throughout the 30 minutes while the sample fluid was pumped through the channel (see FIG. 14(b)), but dropped even more rapidly thereafter (circle annotated curve). The substantially higher shear rate within the fluidic channel will cause a more severe break-up of the initial floccs that have formed immediately after the coagulant addition, and only small and very compact floccs (primary particles) will have survived. On the other hand, during the minutes while the sample fluid was circulated through the channel, all the coagulant was well mixed within the sample and rapid aggregation started after the pump was turned off. In the standard jar test, loose floccs that form does not break up even during rapid mix. Because of their large size, they will diffuse more slowly than more compact aggregates and completion of the growth process will be slower.

Figure 15:
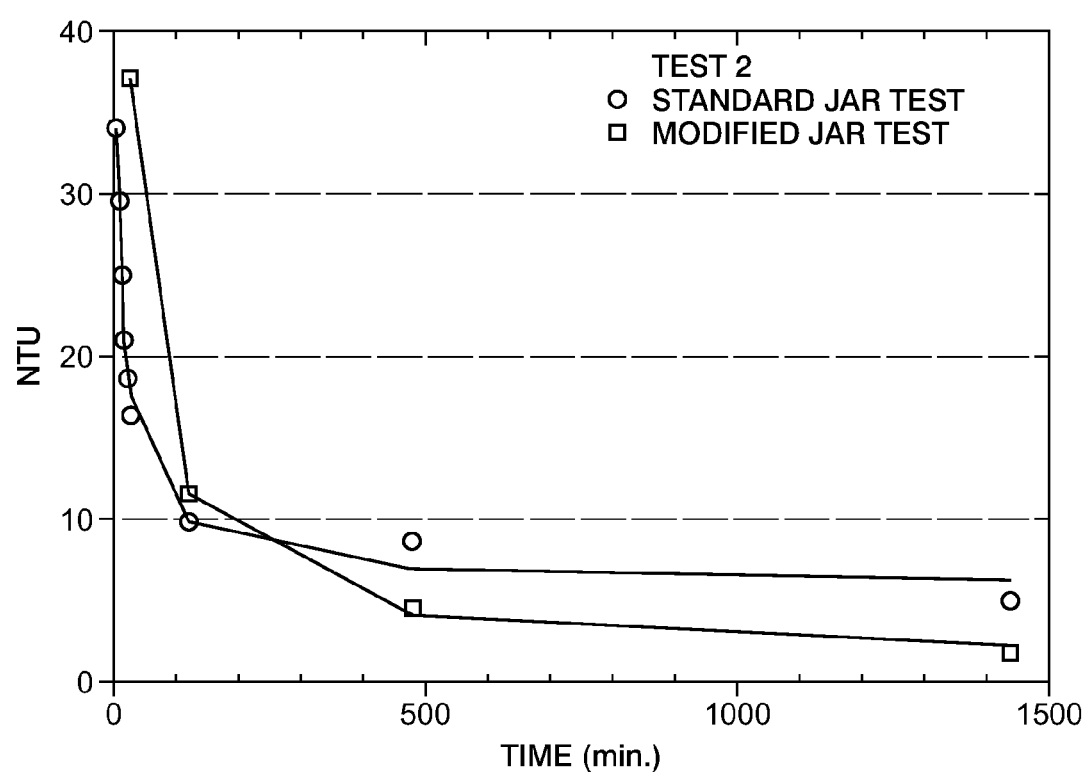
FIG. 15 shows fits of test data to Eqn. (7). Black: standard jar test; red: modified jar test; the solid line is the fit to the data points.

FIG. 15 shows fits of the experimental data to the perikinetic aggregation model of Eqn. (3). Again, the fits are excellent; suggesting that the turbidity decrease seems to be closely related to the reduction of total particle number in solution. The more rapid drop-off in the turbidity readings at long times is most likely caused by sedimentation, which is not included in the fit model, but is expected to have a larger effect on compact particles then on loose floccs.

In summary, the aggregation dynamics depends crucially on the rate and mode of coagulant addition and pH adjustment. Initial inhomogeneities in the coagulant concentration appear to create large loose floccs that do not break up even under the applied stirring rate. These loose floccs have a low diffusion rate due to their large size which leads to a slower growth rate. Step-wise coagulant addition with immediate adjustment of the pH of the sample liquid prevents the uncontrolled growth of large, loose floccs and promotes the formation of more compact aggregates that grow faster due to their faster diffusion rates. Moving the sample fluid through a channel at sufficient flow rate (causing sufficiently large shear rate) will prevent aggregate growth and will lead to break-up of the loose floccs that form during coagulant addition. Once the sample liquid is no longer moving through the micro channel, aggregates grow rapidly, suggesting again the formation of compact particles.

The advantages of the presently described embodiments include:

1) Particulate extraction based on design cut-off down to 1 um
2) Dynamic processing—transport and enhancement of agglomeration kinetics
3) Replacement of intermediate filtration steps
4) Front-end to MWT to lighten the TSS loading
5) Cascaded operation
6) Parallelizable operation
7) Scalable, high-throughput, continuous flow
8) Shorter processing time, smaller footprint, reduce TCO (total cost of ownership)
9) Elimination of flocculation and sedimentation steps—savings on chemicals, land, and operating incidentals including labor, power, etc.
10) May be used for other applications in water including but not limited to IC fab reclaim, cooling tower water, MBR (membrane bio reactor), pre-treatment for RO (reverse osmosis), and waste water reclaim.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A system for dynamic processing for water purification, the system comprising:
   an inlet to receive water from a source;
   a filter stage operative to filter first particles;
   a mixing stage operative to receive and coagulate the filtered water;
   a spiral stage operative to receive the water and separate second particles from the water, wherein the spiral stage comprises a channel in which separation occurs, having a central inlet, structured to provide continuous flow to a peripheral outlet thereof having a split channel egress with a first single channel egress for effluent and a second single channel egress for concentrate; and
   a second filter stage operative to filter third particles from the water.

2. The system as set forth in claim 1 wherein the first filter stage is a screen filter.

3. The system as set forth in claim 1 wherein the spiral stage is incorporated in a single spiral device.

4. The system as set forth in claim 1 wherein the mixing stage is incorporated in a single spiral device.

5. The system as set forth in claim 1 wherein the mixing stage is incorporated in a flash mixer.

6. The system as set forth in claim 1 wherein the spiral stage is incorporated in a first spiral device to receive the coagulated water and treat with flocculant and a second spiral device to separate second particles from the water.

7. The system as set forth in claim 1 wherein the second filter stage is a filter device.

8. The system as set forth in claim 1 further comprising a feedback path to the source or to the inlet of the channel.

9. The system as set forth in claim 8 wherein the feedback path includes a spiral stage for dewatering that receives backwash from the second filter stage.

10. The system as set forth in claim 1 wherein the first particles are approximately 1-3 mm in diameter.

11. The system as set forth in claim 1 wherein the second particles are approximately 5 µm or larger in diameter.

12. The system as set forth in claim 1 wherein the third particles are 0.5 µm or larger in diameter.

13. A system for dynamic processing for water purification, the system comprising:
   an inlet to receive water from a source;
   a filter stage operative to filter first particles;
   a spiral mixing stage operative to receive and coagulate the filtered water, the spiral mixing stage having a central inlet and a peripheral outlet;
   a separating stage operative to receive the coagulated water and treat with flocculant and separate second particles from the water, wherein the separating stage comprises a channel in which separation occurs, having an inlet, structured to provide continuous flow to an outlet thereof having a split channel egress with a first single channel egress for effluent and a second single channel egress for concentrate, wherein the separating stage eliminates sedimentation to separate the second particles;
   a second filter stage operative to filter third particles from the water.

14. The system as set forth in claim 13 wherein the first filter stage is a screen filter.

15. The system as set forth in claim 13 wherein the second filter stage is a filter device.

16. The system as set forth in claim 13 further comprising a feedback path to the source.

17. The system as set forth in claim 13 wherein the first particles are approximately 1-3 mm in diameter.

18. The system as set forth in claim 13 wherein the second particles are approximately 5 µm or larger in diameter.

19. The system as set forth in claim 13 wherein the third particles are 0.5 µm or larger in diameter.

20. The system as set forth in claim 1 wherein the channel is membrane-free.

21. The system as set forth in claim 13 wherein the channel is membrane-free.

22. A system for dynamic processing for water purification, the system comprising:
   an inlet to receive water from a source;
   a filter stage operative to filter first particles;
   a spiral mixing stage operative to receive, coagulate and mix flocculant into the filtered water, the spiral mixing stage having a central inlet and a peripheral outlet;
   a spiral separating stage operative to receive the water from the mixing stages and separate second particles from the water, wherein the spiral stage comprises a channel in which separation occurs, having a central inlet, structured to provide continuous flow to a peripheral outlet thereof having a split channel egress with a first single channel egress for effluent and a second single channel egress for concentrate; and,
   a second filter stage operative to filter third particles from the water.

23. The System as set forth in claim 22 further comprising a water feedback path.

24. A system for dynamic processing for water purification, the system comprising:
   an inlet to receive water from a source;
   a filter stage operative to filter first particles;
   a spiral stage operative to receive the water, mix the water and separate second particles from the water, wherein the spiral stage comprises a channel in which mixing and separation occurs, having a central inlet, structured to provide continuous flow to a peripheral outlet thereof having a split channel egress with a first single channel egress for effluent and a second single channel egress for concentrate; and
   a second filter stage operative to filter third particles from the water.

* * * * *